US011381117B2

(12) United States Patent
Choi et al.

(10) Patent No.: US 11,381,117 B2
(45) Date of Patent: Jul. 5, 2022

(54) WIRELESS CHARGING APPARATUS FOR PREVENTING MAGNETIC FIELD CANCELLATION BETWEEN ADJACENT COILS

(71) Applicant: LG ELECTRONICS INC., Seoul (KR)

(72) Inventors: Hyengcheul Choi, Seoul (KR); Seong Hun Lee, Seoul (KR); Bongsik Kwak, Seoul (KR); Hyung Geol Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

(21) Appl. No.: 16/797,483

(22) Filed: Feb. 21, 2020

(65) Prior Publication Data

US 2021/0066970 A1   Mar. 4, 2021

(30) Foreign Application Priority Data

Sep. 3, 2019   (KR) .......................... 10-2019-0109167

(51) Int. Cl.
| | |
|---|---|
| *H02J 50/50* | (2016.01) |
| *H02J 50/10* | (2016.01) |
| *H02J 50/70* | (2016.01) |
| *H01F 38/14* | (2006.01) |
| *H02J 7/02* | (2016.01) |

(52) U.S. Cl.
CPC ............ *H02J 50/502* (2020.01); *H01F 38/14* (2013.01); *H02J 7/02* (2013.01); *H02J 50/10* (2016.02); *H02J 50/70* (2016.02)

(58) Field of Classification Search
USPC ......................................................... 320/108
See application file for complete search history.

(56) References Cited

U.S. PATENT DOCUMENTS

| | | | |
|---|---|---|---|
| 9,865,391 B2 * | 1/2018 | Bae ......................... | H04B 5/00 |
| 10,361,586 B2 | 7/2019 | Chong | |
| 2010/0201201 A1 | 8/2010 | Mobarhan et al. | |
| 2018/0233273 A1 * | 8/2018 | Park ........................ | H01F 38/14 |

FOREIGN PATENT DOCUMENTS

| | | |
|---|---|---|
| JP | 11-272827 A | 10/1999 |
| JP | 2017-34940 A | 2/2017 |
| JP | 2017-143615 A | 8/2017 |
| KR | 10-2013-0022830 A | 3/2013 |
| KR | 10-2017-0022420 A | 3/2017 |
| KR | 10-2017-0115974 A | 10/2017 |
| KR | 10-2019-0081737 A | 7/2019 |

* cited by examiner

*Primary Examiner* — Bryce M Aisaka
(74) *Attorney, Agent, or Firm* — Birch, Stewart, Kolasch & Birch, LLP

(57) ABSTRACT

Disclosed herein is a wireless charging apparatus for preventing cancelation of magnetic fields generated between a plurality of adjacent transmission coils by placing a repeater on the plurality of transmission coils, the wireless charging apparatus including a plurality of transmission coils spaced the same distance apart from a reference point, and a repeater placed on the plurality of transmission coils to be overlapped with each of the plurality of transmission coils with respect to the reference point that is a center, wherein a coupling coefficient between each of the plurality of transmission coils and the repeater is higher than a coupling coefficient between the plurality of transmission coils.

20 Claims, 9 Drawing Sheets

RELATED ART

WIRELESS CHARGING APPARATUS FOR PREVENTING MAGNETIC FIELD CANCELLATION BETWEEN ADJACENT COILS

CROSS-REFERENCE TO RELATED APPLICATION

This application claims priority to and the benefit of Korean Patent Application No. 10-2019-0109167, filed in Republic of Korea on Sep. 3, 2019, the disclosure of which is incorporated herein by reference in its entirety into the present application.

BACKGROUND

1. Field

The present disclosure relates to a wireless charging apparatus for preventing cancelation of magnetic fields generated between a plurality of transmission coils adjacent to each other, by placing a repeater on the plurality of transmission coils.

2. Background

In a technique for supplying power using a terminal among the ways of charging a battery, commercial power is supplied and is converted into a voltage and electric current adequate for a battery, and electric power is supplied to the battery through a charging terminal.

In the technique for supplying power using a terminal, a potential difference between the charging terminal of the battery and a power supply terminal of the commercial power supply is likely to cause instantaneous discharge, a spark, a fire and the like. Accordingly, in recent years, a wireless charging method using wireless power transmission has been suggested.

Wireless charging is performed by a non-contact power transmission device and a non-contact power reception device, and electromagnetic induction between the two devices enables electric power to transfer from the non-contact power transmission device to the non-contact power reception device.

According to the wireless charging method, even though the wireless charging method is a non-contact method, a physically chargeable range is very narrow because a reception coil in the non-contact power reception device has to be placed on a transmission coil of the non-contact power transmission device.

As a means to solve the above-described problems, a technique for expanding a chargeable range is disclosed in Korean Patent Publication No. 10-2013-0022830 (hereinafter referred to as a related art).

FIG. 1, which is a view illustrating cancelation of magnetic fields generated in a structure of a wireless charging apparatus of the related art, is excerpted from FIG. 14 of the related art.

Referring to FIG. 1, in the related art, a non-contact power transmission device includes a plurality of transmission coils placed in parallel, to stably supply electric power, even though a non-contact power reception device is partially moved on the non-contact power transmission device.

When the plurality of transmission coils are placed next to each other as in the related art, cancelation of magnetic fields occurs between the transmission coils, thereby causing a lower efficiency of power transmission.

Specifically, when each transmission coil illustrated in FIG. 1 is referred to as first to third transmission coils $31a$, $31b$, $31c$, the first to third transmission coils $31a$, $31b$, $31c$ can respectively form an inner area (A, B, and C). If electric currents flow through the first to third transmission coils $31a$, $31b$, $31c$, counterclockwise, a magnetic field generated in the first transmission coil $31a$ causes a magnetic field in area A to ascend perpendicularly, and causes a magnetic field outside of area A to descend perpendicularly.

Additionally, a magnetic field generated in the second transmission coil $31b$ causes a magnetic field in area B to ascend perpendicularly, and causes a magnetic field outside of area B to descend perpendicularly. Likewise, a magnetic field generated in the third transmission coil $31c$ causes a magnetic field in area C to ascend perpendicularly, and causes a magnetic field outside of area C to descend perpendicularly.

In this case, a part of the magnetic field ascending perpendicularly in area B is canceled by a magnetic field generated by the first and third transmission coils $31a$, $31c$ and descending in a height-wise direction, thereby causing a reduction in the intensity of a magnetic field supplied to a reception coil and in efficiency of power transmission.

SUMMARY

The present disclosure is directed to providing a wireless charging apparatus that can prevent cancelation of magnetic fields generated among a plurality of transmission coils, through a repeater.

Additionally, the present disclosure is directed to providing a wireless charging apparatus in which intensity of a magnetic field generated in any one transmission coil and interlinked to a repeater is the same as intensity of a magnetic field generated in another transmission coil and interlinked to the repeater.

Further, the present disclosure is directed to providing a wireless charging apparatus that can transmit electric power using a plurality of sector-shaped transmission coils that forms a circle.

Objectives of the present disclosure are not limited to what has been described. Additionally, other objectives and advantages that have not been mentioned can be clearly understood from the following description and can be more clearly understood from embodiments. Further, it will be understood that the objectives and advantages of the present disclosure can be realized via means and a combination thereof that are described in the appended claims.

According to the present disclosure, a plurality of transmission coils and a repeater placed to be overlapped with each of the plurality of transmission coils are included, and a coupling coefficient between each of the plurality of transmission coils and the repeater is configured to be higher than a coupling coefficient between the plurality of transmission coils, thereby preventing cancelation of magnetic fields generated among the plurality of transmission coils, using the repeater.

Additionally, according to the present disclosure, a width of an area, in which the repeater and each of the plurality of transmission coils are overlapped, is configured to be the same, thereby making intensity of a magnetic field generated in any one transmission coil and interlinked to the repeater identical with intensity of a magnetic field generated in another transmission coil and interlinked to the repeater.

Further, according to the present disclosure, the plurality of transmission coils are formed into a plurality of sector shapes in which a total of central angles is 360 degrees with respect to a reference point that is a center, thereby making it possible to transmit electric power using the plurality of sector-shaped transmission coils.

The present disclosure can prevent cancelation of magnetic fields generated between a plurality of transmission coils through a repeater, thereby preventing a lower efficiency of power transmission caused by the cancelation of magnetic fields generated between adjacent transmission coils.

Additionally, the present disclosure can make intensity of a magnetic field generated in any one transmission coil and interlinked to the repeater identical with intensity of a magnetic field generated in another transmission coil and interlinked to the repeater, thereby guaranteeing uniformity in power transmission to a battery device in an area in which transmission coils are placed.

Further, the present disclosure can transmit electric power using a plurality of sector-shaped transmission coils that form a circle, thereby making it possible to transmit an amount of electric power transmitted by circular coils having the same width through a plurality of coils having a low device performance and to reduce manufacturing costs of a wireless charging apparatus.

Detailed effects of the present disclosure are described together with the above-described effects in the detailed description of the disclosure.

BRIEF DESCRIPTION OF THE DRAWINGS

Embodiments are described in detail with reference to the following drawings, wherein.

DETAILED DESCRIPTION

Figure 1:
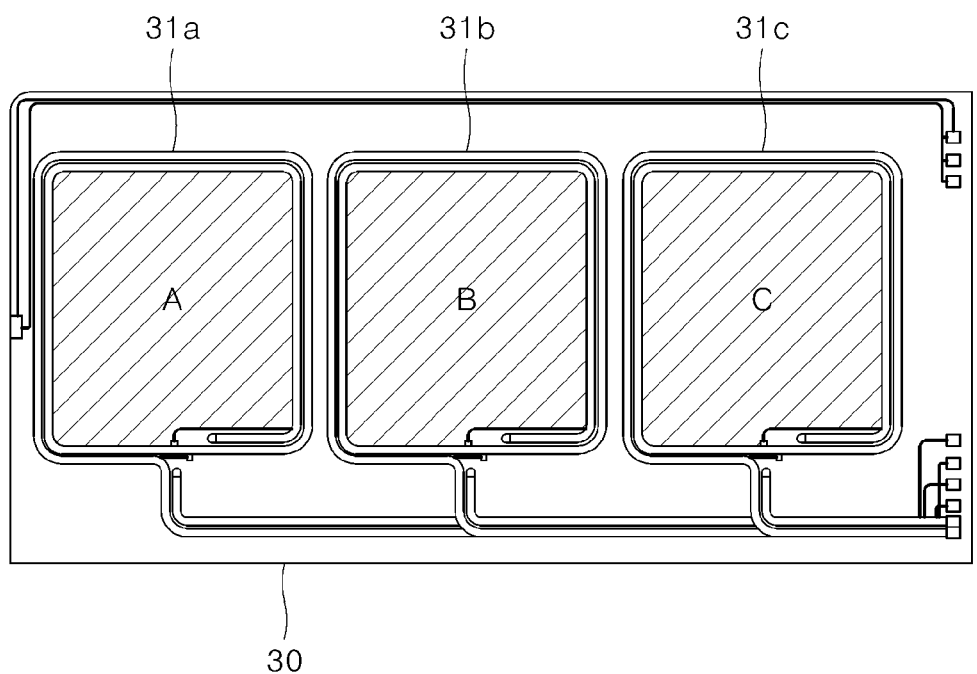
FIG. 1 is a view illustrating cancelation of magnetic fields generated in a structure of a wireless charging apparatus of the related art.

The above-described objectives, features and advantages are specifically described with reference to the attached drawings hereunder such that one having ordinary skill in the art to which the present disclosure pertains can easily implement the technical spirit of the disclosure. In describing the disclosure, detailed description of known technologies in relation to the disclosure is omitted if it is deemed to make the gist of the present disclosure unnecessarily vague. Below, preferred embodiments of the present disclosure are specifically described with reference to the attached drawings. Throughout the drawings, identical reference numerals denote identical or similar components.

When any component is described as being "at an upper portion (or a lower portion)" of a component, or "on (or under)" a component, any component can be placed on an upper surface (a lower surface) of the component, and an additional component can be interposed between the component and any component placed on (or under) the component.

When a component is described as being "connected," "coupled" or "connected" to another component, the component can be directly connected or able to be connected to another component; however, it is also to be understood that an additional component can be "interposed" between the two components, or the two components can be "connected," "coupled" or "connected" through an additional component.

The terms "A or B", "at least one of A or/and B", or "one or more of A or/and B" as used herein include all possible combinations of items enumerated with them. For example, "A or B", "at least one of A and B", or "at least one of A or B" means (1) including at least one A, (2) including at least one B, or (3) including both at least one A and at least one B.

The present disclosure relates to a wireless charging apparatus that can prevent cancelation of magnetic fields generated between a plurality of adjacent transmission coils, by placing a repeater on the plurality of transmission coils.

Below, an exemplary wireless charging apparatus according to one or more embodiments of the present disclosure is specifically described with reference to FIGS. 2 to 9.

Figure 2:
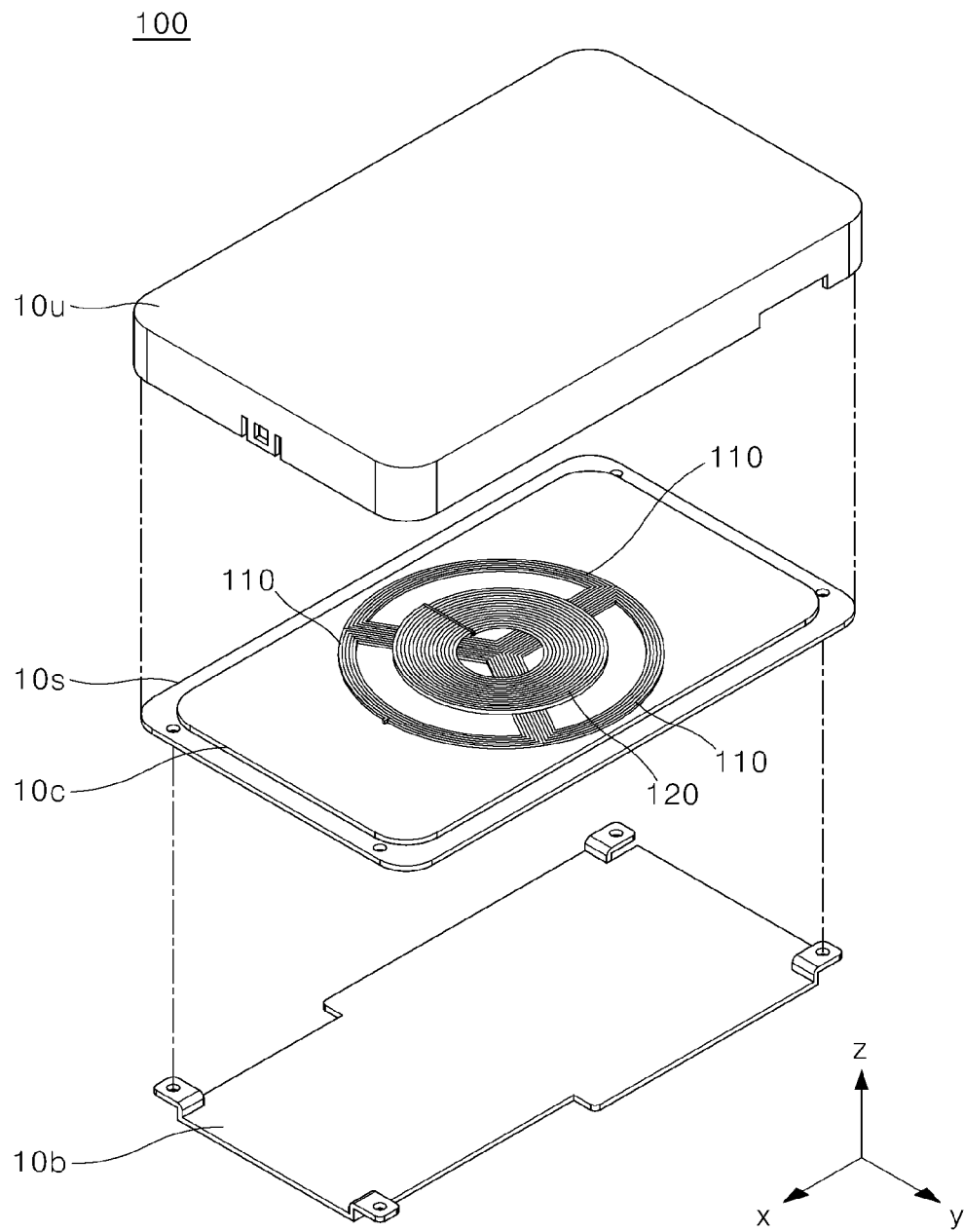
FIG. 2 is a view illustrating an exemplary wireless charging apparatus.
Figure 3:
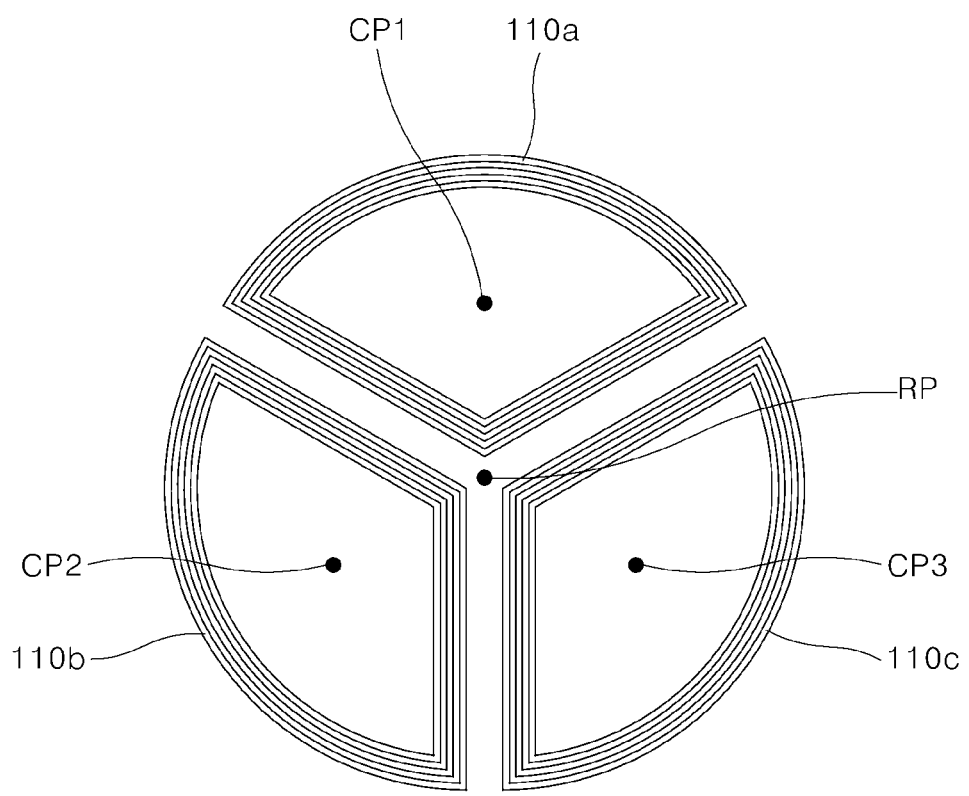
FIGS. 3 to 5 are views illustrating an arrangement of transmission coils according to each example.
Figure 4:
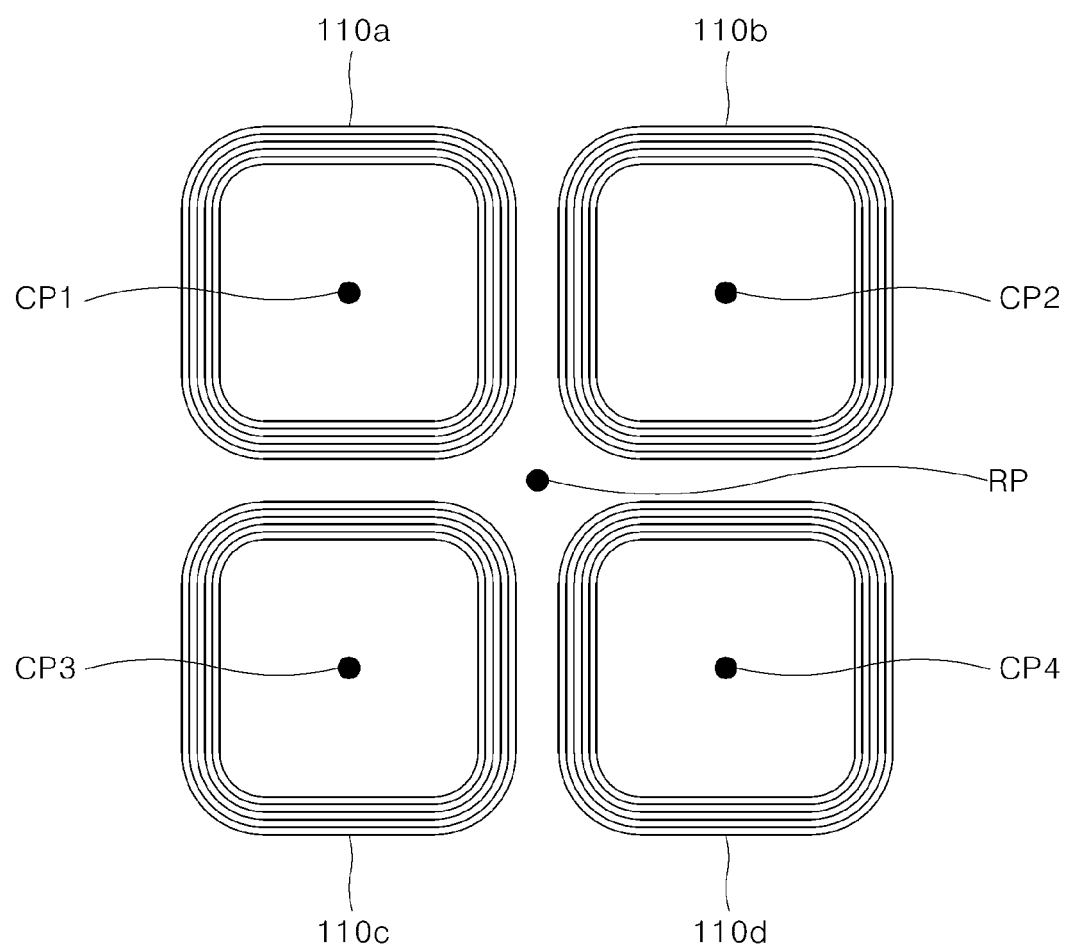
Figure 5:
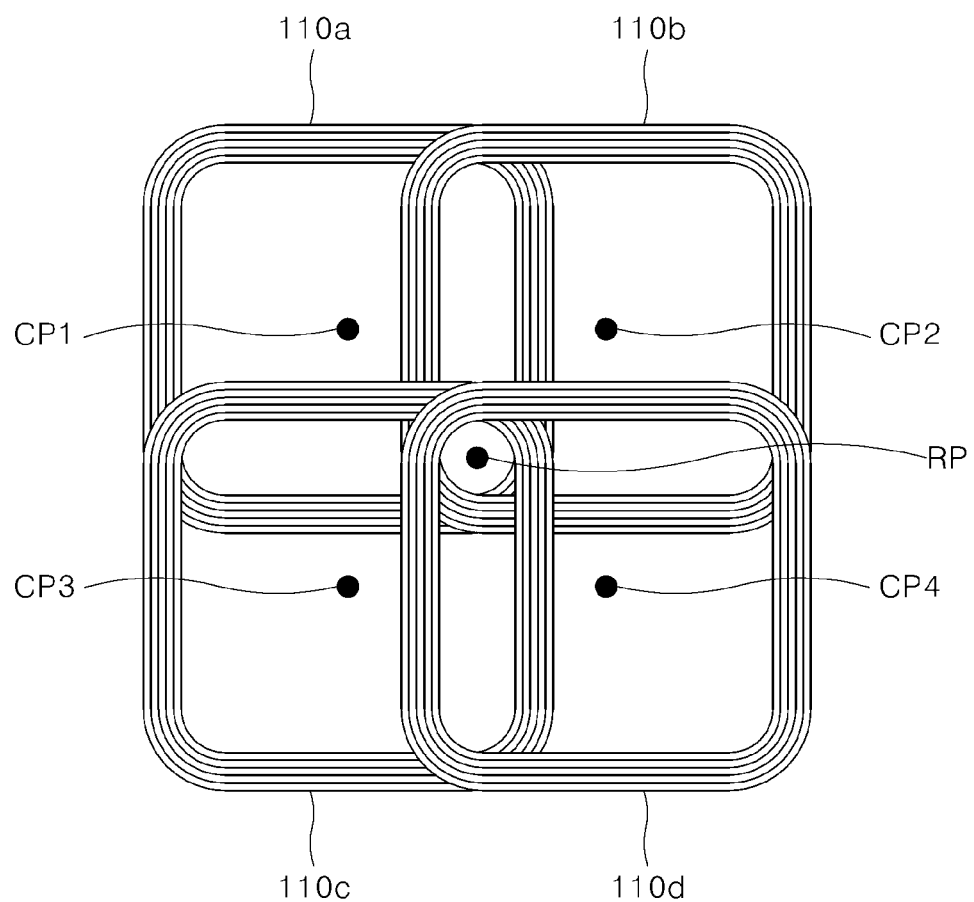

FIG. 2 is a view illustrating an exemplary wireless charging apparatus, and FIGS. 3 to 5 are views illustrating various examples of an arrangement of transmission coils according to the present disclosure.

Figure 6:
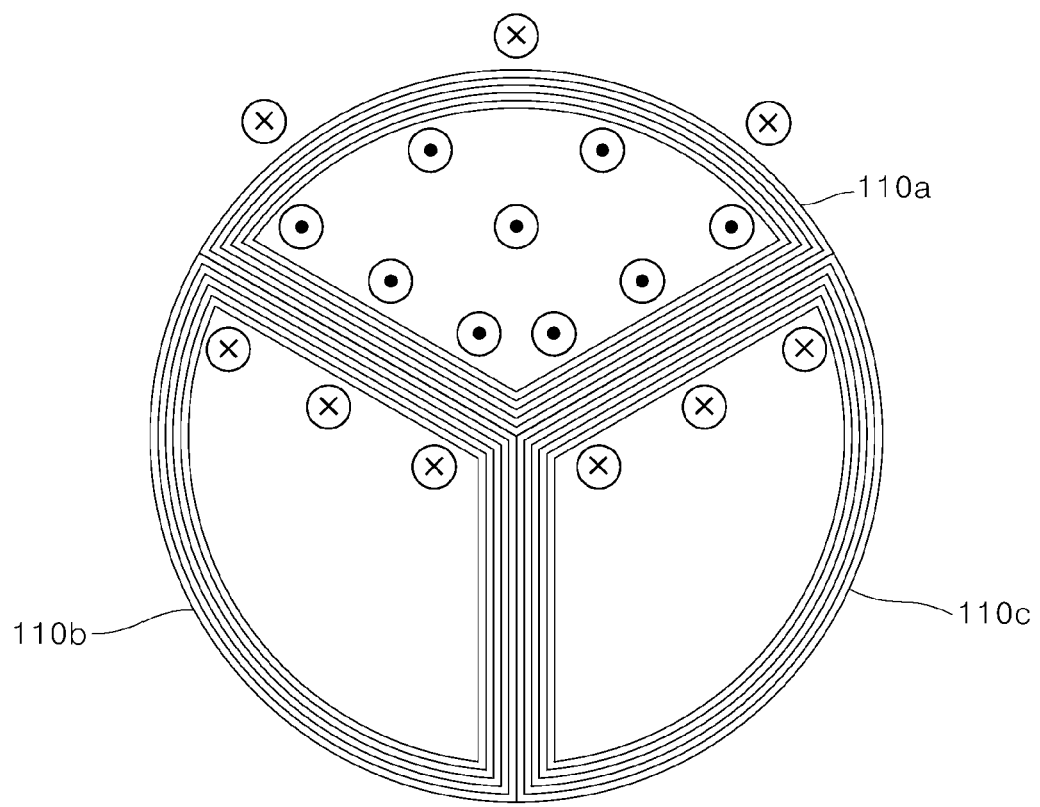
FIG. 6 is a view describing cancelation of magnetic fields generated among a plurality of exemplary transmission coils.

FIG. 6 is a view describing cancelation of magnetic fields generated among a plurality of exemplary transmission coils.

Figure 7:
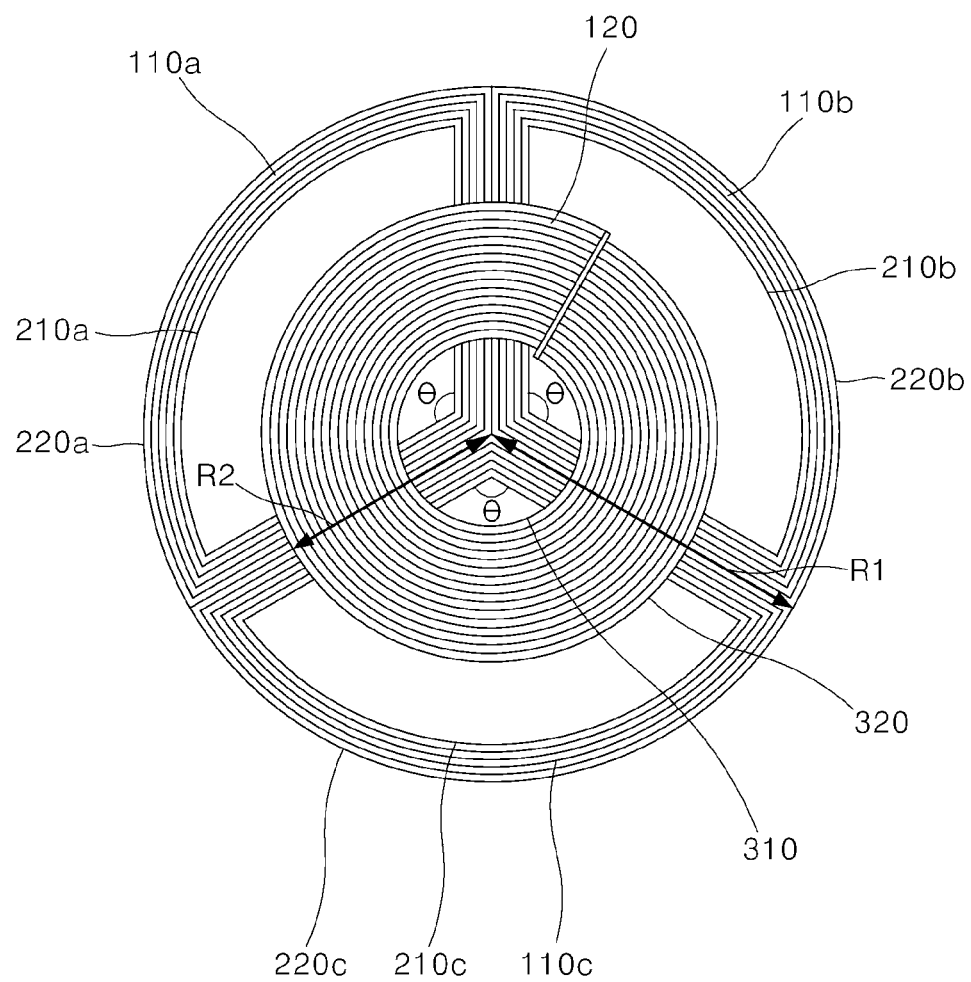
FIGS. 7 and 8 are views illustrating arrangements of a plurality of transmission coils and a repeater according to each example.
Figure 8:
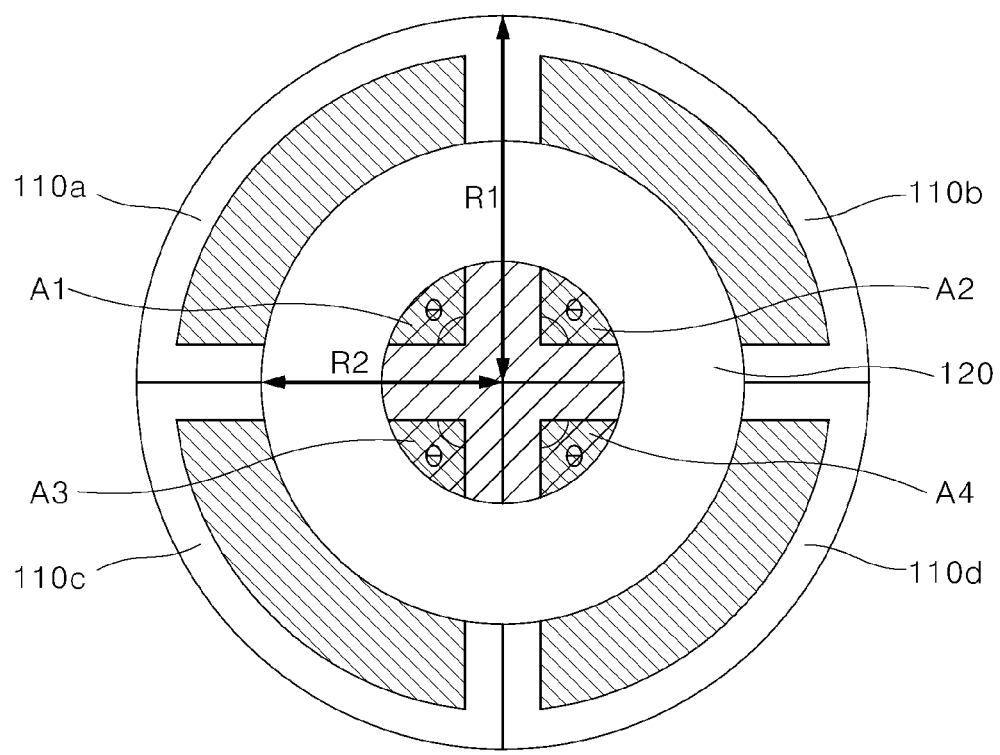
Figure 9:
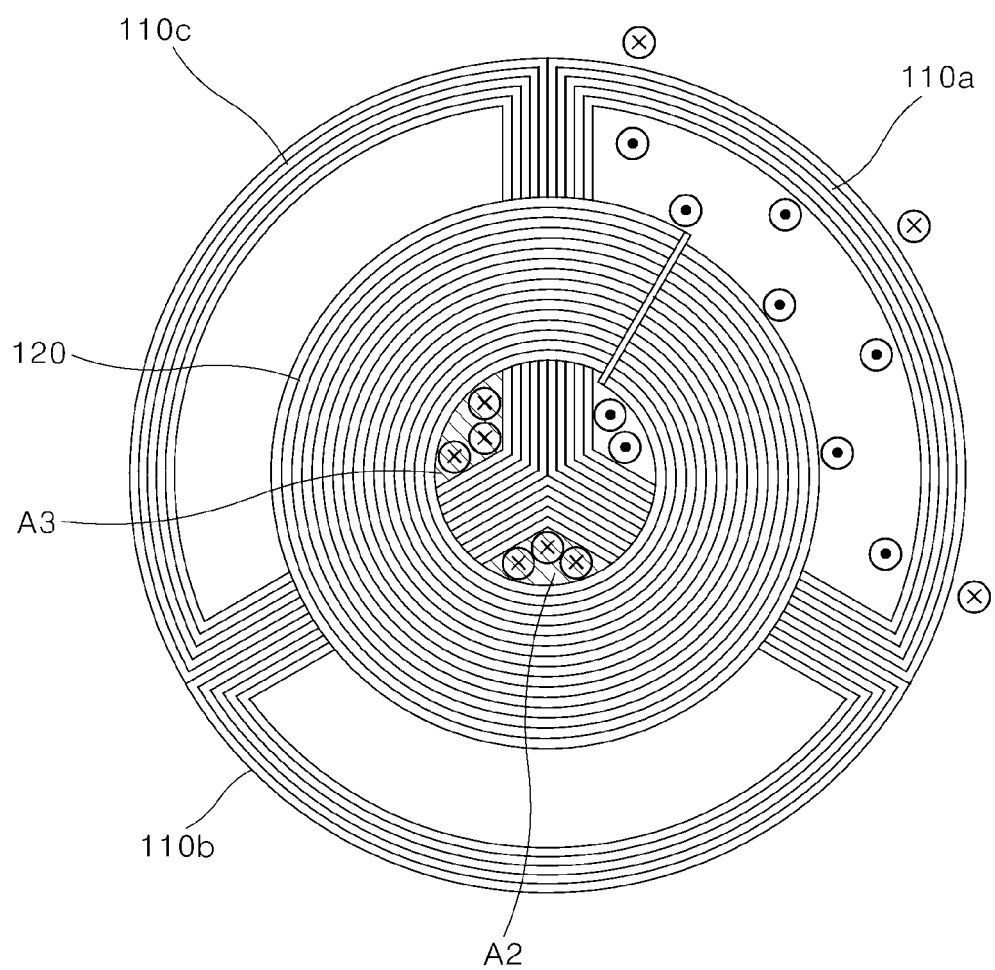
FIG. 9 is a view illustrating cancelation of magnetic fields, which occurs only in a limited area by a repeater.

FIGS. 7 and 8 are views illustrating various examples of arrangements of a plurality of transmission coils and a repeater according to each example, and FIG. 9 is a view illustrating cancelation of magnetic fields, which occurs only in a limited area by a repeater.

Referring to FIG. 2, an exemplary wireless charging apparatus 100 can include a top case 10$u$ and a bottom case 10$b$ that are external structures. A substrate 10$s$ and a flat-plate core 10$c$ provided on the substrate 10$s$ can be provided in an inner space defined by the top case 10$u$ and the bottom case 10$b$. Additionally, a plurality of transmission coils 110 can be provided on the flat-plate core 10$c$, and a repeater 120 can be provided on the plurality of transmission coils 110.

The substrate 10$s$ can include a controller that supplies electric currents to the plurality of transmission coils 110 using an external power supply, and can include a wire or electrically connecting the controller and each transmission coil 110. To this end, the substrate 10$s$ can be implemented as a printed circuit board (PCB), an integrated circuit (IC), and the like.

Additionally, the controller can include a physical component including at least one of application specific integrated circuits (ASICs), digital signal processors (DSPs), digital signal processing devices (DSPDs), programmable logic devices (PLDs), field programmable gate arrays (FPGAs), controllers, microcontrollers, and microprocessors.

The flat-plate core 10$c$ can include a material that has high magnetic permeability and that is hardly breakable. Specifically, the flat-plate core 10$c$ can include an amorphous metallic material such as Co, Fe, Ni, B, Si and the like and a combination thereof, and can have a sheet shape or a thin-film shape. For example, the flat-plate core 10$c$ in the present disclosure can be a ferrite core.

These features can lead the flat-plate core 10c to enhance magnetic flux density of a magnetic field that is generated in the plurality of transmission coils 110 and to efficiently form a magnetic path of the magnetic field.

The plurality of transmission coils 110 that is a flat plate-type coil provided at an upper portion of the flat-plate core 10c can be wound clockwise or counterclockwise. The plurality of transmission coils 110 can be provided with a connection terminal for an electric connection with the above-described controller at both ends of the transmission coils 110. Accordingly, the controller can supply electric currents to the plurality of transmission coils 110 through the connection terminal, and a magnetic field can be generated in the plurality of transmission coils 110.

Below, an arrangement of the transmission coil 110 is specifically described with reference to FIGS. 3 to 5.

The plurality of transmission coils 110 can be spaced the same distance apart from a reference point (RP). The reference point (RP) can be a virtual point for describing the arrangement of the transmission coils 110.

Referring to FIG. 3, the plurality of transmission coils 110 can have a sector shape. In this case, a distance between each transmission coil 110 and the reference point (RP) can be the same. More specifically, when each center of gravity of first to third transmission coils 110a, 110b, 110c illustrated in FIG. 3 is defined as first to third central points CP1, CP2, CP3, a distance between the first central point CP1 and the reference point RP is the same as a distance between the second central point CP2 and the reference point (RP) and a distance between the third central point CP3 and the reference point RP.

Additionally, referring to FIG. 4, the plurality of transmission coils 110 can have a rectangle shape (e.g., square shape). When centers of first to fourth transmission coils 110a, 110b, 110c, 110d illustrated in FIG. 4 are defined as first to fourth central points CP1, CP2, CP3, CP4, a distance between the first central point CP1 and the reference point RP is the same as a distance between the second central point CP2 and the reference point RP, a distance between the third central point CP3 and the reference point RP, and a distance between the fourth central point CP4 and the reference point RP.

In addition to the exemplary shapes illustrated in FIGS. 3 and 4, the plurality of transmission coils 110 can have various shapes in which a distance between central points and the reference point (RP) is the same.

Further, the plurality of transmission coils 110 can be spaced the same distance apart from each other.

Referring back to FIG. 3, the first to third transmission coils 110a, 110b, 110c can have the same size and shape. In this case, each center of gravity of the first to third transmission coils 110a, 110b, 110c is defined as first to third central points CP1, CP2, CP3, a distance between the first central point CP1 and the second central point CP2 can be the same as a distance between the second central point CP2 and the third central point CP3 and a distance between the third central point CP3 and the first central point CP1.

Additionally, referring to FIG. 4, the first to fourth transmission coils 110a, 110b, 110c, 110d can have the same size and shape. In this case, the center of the first to fourth transmission coils 110a, 110b, 110c, 110d is defined as first to fourth central points CP1, CP2, CP3, CP4, a distance between the first central point CP1 and the second central point CP2 can be the same as a distance between the second central point CP2 and the third central point CP3, a distance between the third central point CP3 and the fourth central point CP4, and a distance between the fourth central point CP4 and the first central point CP1.

Unlike the plurality of transmission coils 110 illustrated in FIGS. 3 and 4, the plurality of transmission coils 110 can have different shapes. In this case, the plurality of transmission coils 110 can be arranged in a way that distances between centers of gravity of the transmission coils 110 are respectively the same or in a way that shortest distances between outer edges of the transmission coils 110 are respectively the same.

Further, the plurality of transmission coils 110 can be staked while being spaced the same distance apart from each other.

Referring to FIG. 5, the second transmission coil 110b can be stacked on the first transmission coil 110a, the third transmission coil 110c can be stacked on the second transmission coil 110b, and the fourth transmission coil 110d can be stacked on the third transmission coil 110c.

More specifically, the second transmission coil 110b can be placed at an upper portion of the first transmission coil 110a to be perpendicularly overlapped with a part of the first transmission coil 110a. Likewise, the third and fourth transmission coils 110c, 110d can be respectively at upper portions of the second and third transmission coils 110b, 110c to be perpendicularly overlapped with parts of the second and third transmission coils 110b, 110c. The stacking order is only for convenience of description. The stacking order can differ from the above-described order.

In this case, when centers of the first to fourth transmission coils 110a, 110b, 110c, 110d are defined as first to fourth central points CP1, CP2, CP3, CP4, a distance between the first central point CP1 and the second central point CP2 can be the same as a distance between the second central point CP2 and the third central point CP3, a distance between the third central point CP3 and the fourth central point CP4, and a distance between the fourth central point CP4 and the first central point CP1.

In FIG. 5, the transmission coil 110 having a rectangle shape is provided as an example, but the shape of the transmission coil 110 is not limited.

Additionally, the plurality of transmission coils 110 can also be adjacent to each other.

Referring to FIG. 6, when the plurality of transmission coils 110 have a sector shape as illustrated in FIG. 3, each of the transmission coils 110 can be placed such that outer edges of the transmission coils 110 contact each other. Specifically, when each transmission coil 110 has a sector shape encircled by two sides and an arc connecting ends of the two sides, two sides of any one transmission coil 110 can be placed to respectively contact any one side of another transmission coil 110.

The present disclosure, as described above, can transmit electric power using the plurality of sector-shaped transmission coils 110 that form a circle, thereby making it possible to transmit an amount of electric power transmitted by circular coils having the same width through a plurality of coils having a low device performance and to reduce manufacturing costs of the wireless charging apparatus.

For example, when the plurality of transmission coils 110 illustrated in FIG. 6 is replaced with any one circular coil, an amount of electric current, to be supplied to the circular coil, is significantly increased to output a magnetic field having intensity the same as intensity of a magnetic field generated by the plurality of transmission coils 110. Due to an increase in the amount of electric current, electricity consumption of a wireless charging apparatus 100 is increased, and a costly coil having high internal pressure is required. As a result, production costs of the apparatus are increased.

When the plurality of transmission coils 110 do not have a sector shape, for example, when the plurality of transmission coils 110 have a rectangle shape as illustrated in FIG. 4, the right side and the bottom side of the first transmission coil 110a can be placed respectively in contact with the left side of the second transmission coil 110b and the top side of the third transmission coil 110c. Additionally, the top side and the left side of the fourth transmission coil 110d can be placed respectively in contact with the bottom side of the second transmission coil 110b and the right side of the third transmission coil 110c.

As described above, when the plurality of transmission coils 110 are placed, a magnetic field generated in each transmission coil 110 can be canceled by a magnetic field generated in another transmission coil 110.

Referring back to FIG. 6, electric currents can flow counterclockwise through each transmission coil 110 according to control by the controller. Specifically, electric currents can flow counterclockwise along two sides and an arc, connecting ends of the two sides, of each transmission coil 110.

On the basis of the direction of electric currents, a magnetic field, as illustrated in FIG. 6, can ascend in direction +z (see a coordinate axis in FIG. 2) in an inner area of the first transmission coil 110a, and can descend in direction −z in an outer area of the first transmission coil 110a. Additionally, though not illustrated in the drawing, a magnetic field can ascend in direction +z in an inner area of the second transmission coil 110b, and can descend in direction −z in an outer area of the second transmission coil 110b.

In this case, the magnetic field, ascending in direction +z in the inner area of the second transmission coil 110b by electric currents flowing through the second transmission coil 110b, can be canceled by the magnetic field descending in direction −z in the outer area of the first transmission coil 110a by electric currents flowing through the first transmission coil 110a.

In other words, according to the present disclosure, each transmission coil 110 is placed next to another transmission coil 110, thereby enabling a magnetic field generated by any one transmission coil 110 to be canceled by a magnetic field generated by another adjacent transmission coil 110.

The cancelation of magnetic fields results in a lower efficiency of power transmission of the transmission coil 110. Accordingly, prevention of the cancelation of magnetic fields generated in an inner area of each coil is required.

Below, a repeater 120 that is placed on the plurality of transmission coils 110 and that prevents cancelation of magnetic fields generated in the inner area of each coil is specifically described with reference to FIGS. 7 to 9. Suppose that the transmission coils 110 have a sector shape respectively and are placed next to each other, hereunder.

When the plurality of transmission coils 110 are spaced the same distance apart from the reference point (RP), the repeater 120 can be placed on the plurality of transmission coils 110 to be overlapped with each of the plurality of transmission coils 110, taking the reference point (RP) as a center.

When the plurality of transmission coils 110 are placed in the same layer, the repeater 120 can be placed in contact with an upper surface of each transmission coil 110. When the plurality of transmission coils 110 are stacked as in FIG. 5, the repeater 120 can be placed in contact with an upper surface of a coil placed in the uppermost layer.

The repeater 120 can be disposed on the plurality of transmission coils 110 to be overlapped with a part of each transmission coil 110. The repeater 120 can have a ring shape that has an outer edge 320 and an inner edge 310. For example, the repeater 120 can have a ring shape that has an outer diameter and an inner diameter, and can have a rectangular ring shape that has an outer side and an inner side.

In this case, the repeater 120 can be placed such that an area encircled by the outer edge 320 is not expanded to an area formed by the plurality of transmission coils 110. The area formed by the plurality of transmission coils 110 can be an area encircled by extension lines of the outer edges of the plurality of transmission coils 110. In the arrangement, the repeater 120 can be placed in a range of a z-axis direction of magnetic fields generated in the transmission coil 110 all the time.

Referring to FIG. 7, each of the plurality of transmission coils 110 can have a sector shape with respect to the reference point (RP) that is a center. In this case, a central angle (θ) of each of the plurality of transmission coils 110 can be the same, and a total of the central angle (θ) of each of the plurality of transmission coils 110 can be 360 degrees. In other words, each of the plurality of transmission coils 110 can have a sector shape in which a circle is divided by equal angles.

Referring back to FIG. 7, when the plurality of transmission coils 110a, 110b, 110c have three sector shapes, a central angle (θ) of each transmission coil 110a, 110b, 110c is equally 120 degrees, and the transmission coils 110a, 110b, 110c are placed in contact with each other. Accordingly, the area formed by the plurality of transmission coils 110a, 110b, 110c can be a circle.

Referring to FIG. 8, when the plurality of transmission coils 110a, 110b, 110c, 110d have four sector shapes, a central angle (θ) of each transmission coil 110a, 110b, 110c, 110d is equally 90 degrees, and the transmission coils 110a, 110b, 110c, 110d are placed in contact with each other. Accordingly, the area formed by the plurality of transmission coils 110a, 110b, 110c, 110d can be a circle.

Each of the plurality of transmission coils 110 can have a sector shape the radius of which is a first length (R1). The radius of each transmission coil 110 can be defined as a distance from the reference point (RP) to the outer edge that constitutes the arc.

In the example of FIG. 7, a distance between the reference point (RP) and the outer edge 220a of the first transmission coil 110a, a distance between the reference point (RP) and the outer edge 220b of the second transmission coil 110b, and a distance between the reference point (RP) to the outer edge 220c of the third transmission coil 110c can all be the first length (R1). The first, second and third transmission coils 110a, 110b, 110c also include inner edges 210a, 210b, 210c, respectively.

In this case, the repeater 120 can have a ring shape the radius of which is a second length (R2) shorter than the first length (R1) with respect to the reference point (RP) that is a center. The radius of the repeater 120 can be defined as a distance from the reference point (RP) to the outer edge 320.

Accordingly, the repeater 120 can be placed to be overlapped with a part of each of the transmission coils 110. More specifically, an area encircled by an inner edge 310 of the repeater 120 can be overlapped with an area encircled by an inner edge of each of the plurality of transmission coils 110.

Referring to FIG. 8 in which details shapes of each transmission coil 110 and the repeater 120 are omitted for convenience of description, the repeater 120 can have a ring shape that is encircled by an inner edge 310 and an outer edge 320. In this case, a circular area encircled by the inner edge 310 of the repeater 120 can be overlapped with a sector area encircled by the inner edge of each of the plurality of transmission coils 110. Specifically, the area encircled by the inner edge 310 of the repeater 120 can include a first overlapped area (A1) overlapped with the area encircled by the inner edge of the first transmission coil 110a, a second overlapped area (A2) overlapped with the area encircled by the inner edge of the second transmission coil 110b, and third and fourth overlapped areas (A3, A4) respectively overlapped with the areas encircled by the inner edges of the third and fourth transmission coils 110c, 110d.

In this case, a width of the area in which the repeater 120 is overlapped with each of the plurality of transmission coils 110 can be the same.

In the example of FIG. 8, the first to fourth overlapped areas can have the same width. To this end, a longitudinal section of each transmission coil 110a, 110b, 110c, 110d can have the same width. More specifically, a gap between the outer edge and the inner edge of the first transmission coil 110a can be the same as a gap between the outer edge and the inner edge of the second to fourth transmission coils 110b, 110c, 110d.

When a gap between an outer edge and an inner edge of each transmission coil 110 is the same even in the case of the plurality of transmission coils 110 having a rectangle shape illustrated in FIGS. 4 and 5, an area in which the repeater 120 and each of the plurality of transmission coils 110 are overlapped can have the same width.

In the above-described arrangement of the plurality of transmission coils 110 and the repeater 120, a coupling coefficient between each of the plurality of transmission coils 110 and the repeater 120 can be higher than a coupling coefficient between the plurality of transmission coils 110. In other words, a degree of an electronic coupling between the repeater 120 and each transmission coil 110 can be greater than a degree of an electronic coupling between any one transmission coil 110 and another transmission coil 110.

Accordingly, an amount of interlinkage of a magnetic field generated in any one transmission coil 110 can be greater in the repeater 120 than in another transmission coil 110.

Detailed description is provided with reference to FIG. 9. As described in FIG. 6, when electric currents flow counterclockwise through the first transmission coil 110a, a magnetic field generated in the first transmission coil 110a can descend in direction −z outside of the first transmission coil 110a. However, when a coupling coefficient between the first transmission coil 110a and the repeater 120 is higher than a coupling coefficient between the first transmission coil 110a and the second and third transmission coils, as described above, the magnetic field descending in direction −z can be interlinked in inner areas (A2, A3) of the repeater 120.

In other words, an amount of interlinkage of the magnetic field of direction −z, which is otherwise widely interlinked in the inner areas of the second and third transmission coils 110b, 110c as illustrated in FIG. 6, is greater in the repeater 120 than in the second and third transmission coils 110b, 110c. Accordingly, the magnetic field can be locked in the inner area of the repeater 120, which is relatively narrow, as illustrated in FIG. 9.

As a result, when electric currents flow through the second and third transmission coils 110b, 110c, magnetic fields of direction +z generated in the second and third transmission coils 110b, 110c are canceled only in the narrow area. Thus, an amount of cancelation of the magnetic field can be reduced.

The present disclosure, as described above, can prevent cancelation of magnetic fields generated between the plurality of transmission coils 110 through the repeater 120, thereby making it possible to prevent lower efficiency of power transmission, caused by the cancelation of magnetic fields generated between adjacent transmission coils 110.

As described with reference to FIG. 8, when a width of an area in which the repeater 120 is overlapped with each of the plurality of transmission coils 110 is the same, the present disclosure makes intensity of a magnetic field generated in any one transmission coil 110 and interlinked to the repeater 120 identical with intensity of a magnetic field generated in another transmission coil 110 and interlinked to the repeater 120, thereby guaranteeing uniformity of power transmission to a battery device in an area in which the transmission coils 110 are placed.

Additionally, a battery device can be held on the above-described wireless charging apparatus 100. In other words, the battery device can be held at any position of an upper portion of the top case 10u illustrated in FIG. 1. The battery device can include an inner battery and a reception coil. Electric currents are guided to the reception coil by a magnetic field generated in the above-described transmission coil 110, and the inner battery can be charged by the electric currents guided to the reception coil.

The controller provided on the substrate 10s can supply electric currents to the plurality of transmission coils 110 to guide the electric currents to the reception coil. More specifically, when detecting the reception coil, the controller can supply electric currents to all the plurality of transmission coils 110. In other words, when not detecting the reception coil, the controller may not supply electric currents to any transmission coil 110 and then, when detecting the reception coil, can supply electric currents to all the transmission coils 110.

To this end, the controller can detect the reception coil. More specifically, the controller can supply electric currents to any one transmission coil 110 among the plurality of transmission coils 110, can transmit a request signal to the battery device, and can detect the reception coil on the basis of whether to receive a response signal to the request signal.

The controller can transmit a request signal to the battery device by controlling frequencies of electric current supplied to any transmission coil 110. When receiving the request signal through the reception coil, the battery device can transmit a response signal by controlling frequencies of electric current supplied to the reception coil. The response signal transmitted by the battery device can be received by the controller through the transmission coil 110.

When receiving the response signal, the controller can determine that the battery device is held on the wireless charging apparatus 100, and can supply electric currents to all the plurality of transmission coils 110. Accordingly, magnetic fields can be generated in the plurality transmission coils 110, and the generated magnetic fields can be supplied to the reception coil through the repeater 120.

Further, a coupling coefficient between the reception coil and the repeater 120 can be higher than a coupling coefficient between the reception coil and each of the plurality of transmission coils 110.

A surface of the reception coil on the wireless charging apparatus 100 can be smaller than a surface of the area formed by the plurality of transmission coils 110. For example, the surface of the reception coil can be the same as a surface of the repeater 120, and the reception coil can be placed on the repeater 120.

When a coupling coefficient between the reception coil and the transmission coil 110 is higher than a coupling coefficient between the reception coil and the repeater 120, a magnetic field generated in the transmission coil 110 is directly interlinked to the reception coil. In this case, because the surface of the area formed by the transmission coil 110 is larger than the surface of the reception coil, a large amount of magnetic field can be leaked.

To prevent the leakage, a coupling coefficient between the reception coil and the repeater 120 is configured to be higher that a coupling coefficient between the reception coil and each of the plurality of transmission coils 110, and, accordingly, a wide range of magnetic fields generated in the transmission coils 110 can be concentrated by the repeater and can be interlinked to the reception coil.

The present disclosure can be replaced, modified and changed in various different forms by one having ordinary skill in the art within the technical spirit of the disclosure. Therefore, the disclosure is not limited to the above-described embodiments and the attached drawings.

What is claimed is:

1. A wireless charging apparatus, comprising:
   a plurality of transmission coils disposed adjacent to each other; and
   a repeater placed on the plurality of transmission coils to be overlapped with each of the plurality of transmission coils,
   wherein a coupling coefficient between one of the plurality of transmission coils and the repeater is higher than a coupling coefficient between two of the plurality of transmission coils.

2. The wireless charging apparatus of claim 1, wherein the plurality of transmission coils are spaced at a same distance apart from a reference point of the wireless charging apparatus.

3. The wireless charging apparatus of claim 2, wherein the reference point is a center of the repeater.

4. The wireless charging apparatus of claim 1, further comprising:
   a flat-plate core on which the plurality of transmission coils are placed.

5. The wireless charging apparatus of claim 1, wherein the plurality of transmission coils are spaced a same distance apart from each other, or the plurality of transmission coils are stacked.

6. The wireless charging apparatus of claim 1, wherein the plurality of transmission coils comprise:
   a first transmission coil;
   a second transmission coil placed at an upper portion of the first transmission coil, and overlapping a part of the first transmission coil;
   a third transmission coil placed at an upper portion of the second transmission coil, and overlapping a part of the first transmission coil and a part of the second transmission coil; and
   a fourth transmission coil placed at an upper portion of the third transmission coil, and overlapping a part of the first transmission coil. a part of the second transmission coil, and a part of the third transmission coil.

7. The wireless charging apparatus of claim 1, wherein a coupling coefficient between each of the plurality of transmission coils and the repeater is higher than the coupling coefficient between the two of the plurality of transmission coils.

8. The wireless charging apparatus of claim 1, wherein each of the plurality of transmission coils has a rectangle shape, and
   wherein the plurality of transmission coils comprise:
   a first transmission coil;
   a second transmission coil placed in contact with one side of the first transmission coil;
   a third transmission coil placed in contact with another side of the first transmission coil; and
   a fourth transmission coil placed in contact with one side of the second transmission coil and one side of the third transmission coil.

9. The wireless charging apparatus of claim 1, wherein the plurality of transmission coils disposed adjacent to each other to form a first ring having a first radius,
   the repeater has a ring shape having a second radius,
   the first radius and the second radius have a same center point, and
   the first radius is larger than the second radius.

10. The wireless charging apparatus of claim 1, wherein a central angle of each of the plurality of transmission coils is the same.

11. The wireless charging apparatus of claim 10, wherein a total of the central angle of each of the plurality of transmission coils is 360 degrees.

12. The wireless charging apparatus of claim 1, wherein each of the plurality of transmission coils has a sector shape encircled by two sides and an arc connecting ends of the two sides, and
   wherein the plurality of transmission coils comprise:
   a first transmission coil with a central angle of approximately 120 degrees;
   a second transmission coil placed in contact with one side of the first transmission coil with a central angle of approximately 120 degrees; and
   a third transmission coil placed in contact with another side of the first transmission coil with a central angle of approximately 120 degrees.

13. The wireless charging apparatus of claim 1, wherein an area encircled by an outer edge of the repeater is placed inside an area formed by the plurality of transmission coils.

14. The wireless charging apparatus of claim 1, wherein an area encircled by an inner edge of the repeater overlaps an area encircled by an inner edge of each of the plurality of transmission coils.

15. The wireless charging apparatus of claim 1, wherein a width of an area in which the repeater and a first one of the plurality of transmission coils are overlapped is the same as a width of an area in which the repeater and a second one of the plurality of transmission coils are overlapped.

16. The wireless charging apparatus of claim 1, wherein the wireless charging apparatus further comprises a controller that supplies electric currents to the plurality of transmission coils to guide the electric currents to a reception coil in a battery device, and
   when detecting the reception coil, the controller supplies electric currents to all of the plurality of transmission coils.

17. The wireless charging apparatus of claim 16, wherein the controller supplies electric currents to any one transmission coil among the plurality of transmission coils, transmits a request signal to the battery device, and detects the reception coil based on whether to receive a response signal to the request signal.

18. The wireless charging apparatus of claim 16, wherein a coupling coefficient between the reception coil and the repeater is higher than a coupling coefficient between the reception coil and each of the plurality of transmission coils.

19. The wireless charging apparatus of claim 1, wherein the plurality of transmission coils are disposed adjacent to each other to form a configuration, and a width of the formed configuration of the plurality of transmission coils is greater than a width of the repeater.

20. The wireless charging apparatus of claim 19, wherein each of the plurality of transmission coils has a sector shape, a square shape, or a rectangle shape.

* * * * *